A. S. BULLOCK.
MEAT TENDERER.
APPLICATION FILED JUNE 7, 1910.
988,170.
Patented Mar. 28, 1911.
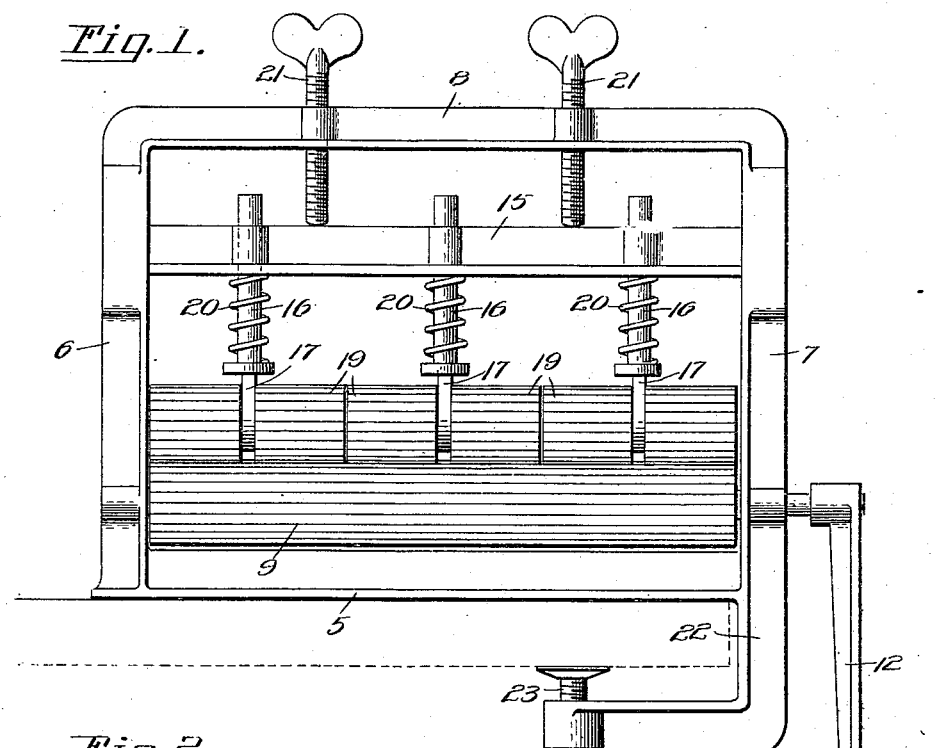
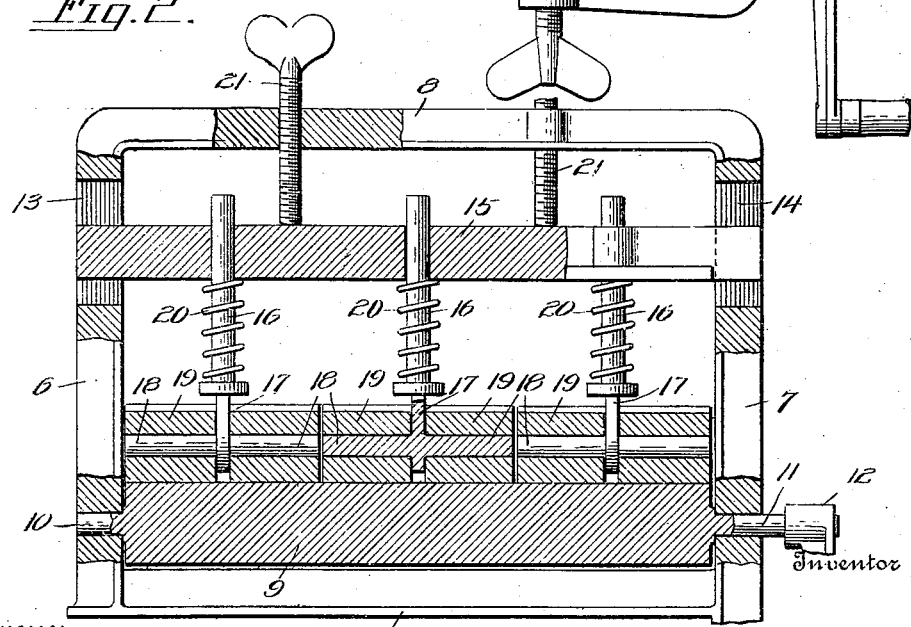
Witnesses
F. C. Gibson.
John A. Dewey.
Inventor
Arthur S. Bullock.
By Victor J. Evans
Attorney

UNITED STATES PATENT OFFICE.

ARTHUR S. BULLOCK, OF AITKIN, MINNESOTA.

MEAT-TENDERER.

988,170.

Specification of Letters Patent.    Patented Mar. 28, 1911.

Application filed June 7, 1910. Serial No. 565,434.

*To all whom it may concern:*

Be it known that I, ARTHUR S. BULLOCK, a citizen of the United States, residing at Aitkin, in the county of Aitkin and State of Minnesota, have invented new and useful Improvements in Meat-Tenderers, of which the following is a specification.

This invention relates to improvements in meat tenderers and more particularly to the type wherein the meat to be made tender is passed between a plurality of toothed rollers.

One object of the invention is the provision of a meat tenderer provided with a plurality of relatively movable rollers certain of which are adapted to yield when a bone or other hard substance is met with in the meat.

With these and other objects in view, which will more fully hereinafter appear, the present invention consists in certain novel details of construction and arrangement of parts, hereinafter fully described, illustrated in the accompanying drawings, and more particularly pointed out in the appended claims.

In the accompanying drawings, forming part of the specification;—Figure 1 is a front elevation of the device. Fig. 2 is a sectional front elevation of the same.

A supporting frame comprises a base plate 5 from the opposite ends of which rise side members 6 and 7, the upper ends of which are connected by a cross piece 8. A corrugated roller is designated by the numeral 9 and is provided at its opposite ends with trunnions 10 and 11, which are journaled in the lower end portions of the sides 6 and 7 and adjacent to the base plate 5. One of the trunnions extends beyond the outer face of one of the side walls and is provided with a crank handle 12 by means of which the roller may be rotated.

The upper end portions of the side members 6 and 7 are provided with guide openings 13 and 14, and slidingly fitted in said guide openings 13 and 14 are the reduced opposite end portions of a tensioning bar 15. What will subsequently be termed hangers are shown to include shank portions 16, said shank portions being slidingly fitted in openings in the bar 15. The lower ends of the shank portions 16 are provided with flattened heads 17, the flat faces of which are presented toward the inner faces of the sides 6 and 7. In the present instance three of these hangers are shown the same being in horizontal alinement, and extending outwardly from the opposite sides of the flat faces of the head 17 are shafts 18. The opposite ends of the shafts carried by the middle hanger are in juxtaposition to the inner ends of the shafts carried by the outer hangers, while the outer ends of the shafts carried by the hangers extend to points adjacent the inner faces of the side walls of the sides 6 and 7. Journaled on the shafts 18 are a plurality of corrugated rollers 19, the surfaces of which bear on the surface of the roller 9. Encircling the shanks 16 with their opposite terminals bearing on the upper ends of the heads 17 and lower face of the tension bar 15 are helical compression springs 20, which serve to yieldingly hold the rollers 19 in engagement with the roller 9. Threaded into openings formed in the cross piece 8 are set screws 21, the lower ends of which bear on the upper face of the tension bar, the said set screws serving to tension the tension bar relative to the roller 9.

With this construction it will be manifest when a steak is passed between the rollers 9 and 19 and a bone in the steak is engaged by any pair of the rollers 19, the said pair which engage with the bone will yield upwardly, while the remaining rollers will coöperate with the roller 9 to mutilate the steak in a well-known manner.

A suitable clamp is shown to be formed of a single piece of metal bent into substantially a U-shape and designated by the numeral 22. One side of this clamp is secured to the base plate 5, while the free end portion of the opposite side has threaded therein a clamp screw 23, to engage with the lower face of a table or other support upon which the base plate is arranged.

From the foregoing, it is evident that I have provided a device which is comparatively simple in structure and inexpensive in manufacture, embodying few parts and these so arranged that the danger of derangement will be reduced to a minimum.

I claim:—

1. A meat tenderer comprising a supporting frame, a toothed roller journaled in said frame, a bar located in the frame, and a plurality of rollers slidingly fitted on the bar and yieldingly held in engagement with the first-named roller.

2. A meat tenderer comprising a supporting frame, a toothed roller journaled in said frame, a bar adjustably secured in said frame, a plurality of rollers having supporting shanks slidingly fitted in the bar, and thrust springs surrounding the shanks and operating to hold the second-named rollers in engagement with the first-named roller.

3. In a meat tenderer, a supporting frame, a roller journaled in said frame, a bar adjustably secured in said frame, a shaft provided at its opposite ends with rollers, an arm extending upwardly from the medial portion of the shaft and slidingly fitted in the bar, a spring surrounding the arm and bearing on the lower end portion of the latter and bar, for the purpose described.

In testimony whereof I affix my signature in presence of two witnesses.

ARTHUR S. BULLOCK.

Witnesses:
 LOUIS HALLUM,
 MARCUS FREDERICKSON.

---

Copies of this patent may be obtained for five cents each, by addressing the "Commissioner of Patents, Washington, D. C."